(12) United States Patent
Seigler et al.

(10) Patent No.: US 8,848,307 B2
(45) Date of Patent: Sep. 30, 2014

(54) ACTIVE MEDIA FOR HEAT ASSISTED MAGNETIC RECORDING (HAMR)

(75) Inventors: Michael Allen Seigler, Eden Prairie, MN (US); William Challener, Glenville, NY (US)

(73) Assignee: Seagate Technology LLC, Cupertino, CA (US)

( * ) Notice: Subject to any disclaimer, the term of this patent is extended or adjusted under 35 U.S.C. 154(b) by 160 days.

(21) Appl. No.: 13/364,354

(22) Filed: Feb. 2, 2012

(65) Prior Publication Data

US 2013/0201805 A1    Aug. 8, 2013

(51) Int. Cl.
G11B 5/02 (2006.01)

(52) U.S. Cl.
USPC .............................. 360/59; 360/135

(58) Field of Classification Search
None
See application file for complete search history.

(56) References Cited

U.S. PATENT DOCUMENTS

| | | | |
|---|---|---|---|
| 5,997,978 A | 12/1999 | Ichihara et al. | |
| 6,593,014 B1 | 7/2003 | Ogimoto et al. | |
| 6,802,073 B1 | 10/2004 | Takahashi et al. | |
| 7,412,143 B2 | 8/2008 | Rottmayer et al. | |
| 7,929,239 B2* | 4/2011 | Mryasov et al. | 360/59 |
| 8,481,181 B2* | 7/2013 | Wang et al. | 428/812 |
| 2008/0198738 A1 | 8/2008 | Lu et al. | |

OTHER PUBLICATIONS

U.S. Appl. No. 11/640,708, filed Dec. 18, 2006; Data Storage Apparatus Including Optically Active Nano-Patterned Media and Electric Field Assisted Recording Method; First Named Inventor: Oleg N. Mryasov, Bradford Woods, PA.

* cited by examiner

*Primary Examiner* — Paul Huber
(74) *Attorney, Agent, or Firm* — Hollingsworth Davis, LLC

(57) ABSTRACT

An apparatus includes a magnetic recording layer and a thermally active material adjacent to and/or embedded in the magnetic recording layer, wherein the thermally active material has a thermal property that changes when the temperature of the thermally active material changes, or undergoes a phase transition in a predetermined temperature range, to reduce a peak temperature or increase a thermal gradient of a heated portion of the magnetic recording layer.

15 Claims, 5 Drawing Sheets

ACTIVE MEDIA FOR HEAT ASSISTED MAGNETIC RECORDING (HAMR)

BACKGROUND

Heat assisted magnetic recording (HAMR) generally refers to the concept of locally heating a recording media to reduce the coercivity of the media so that an applied magnetic writing field can more easily direct the magnetization of the media during the temporary magnetic softening of the media caused by the heat source. A tightly confined, high power light spot is used to heat a portion of the recording media to substantially reduce the coercivity of the heated portion. Then, the heated portion is subjected to a magnetic field that sets the direction of magnetization of the heated portion. In this manner, the coercivity of the media at ambient temperature can be much higher than the coercivity during recording, thereby enabling stability of the recorded bits at much higher storage densities and with much smaller bit cells. Heat assisted magnetic recording is also referred to a thermally assisted magnetic recording.

One approach for directing light onto recording media uses a planar solid immersion mirror (PSIM) or lens, fabricated on a planar waveguide and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

When the recording media is heated by the NFT in HAMR, the center of the hot spot gets considerably hotter than the region where the magnetic transition is written.

SUMMARY

In one aspect of the disclosure, an apparatus includes a magnetic recording layer and a thermally active material adjacent to and/or embedded in the magnetic recording layer, wherein the thermally active material has a thermal property that changes when the temperature of the thermally active material changes, or undergoes a phase transition in a predetermined temperature range, to reduce a peak temperature or increase a thermal gradient of a heated portion of the magnetic recording layer.

These and other features and advantages which characterize the various embodiments of the present disclosure can be understood in view of the following detailed discussion and the accompanying drawings.

DETAILED DESCRIPTION

In one aspect, this disclosure provides a data storage media for heat assisted magnetic recording (HAMR) that includes materials in the media stack that have thermal properties (e.g., thermal conductivity or specific heat) that change strongly with temperature in the temperature range at which the HAMR media will operate (i.e., from room temperature to about 1000° K) or where the material goes through a first order phase transition within this temperature range. For the purposes of this description, such materials are referred to as thermally active materials.

Figure 1:
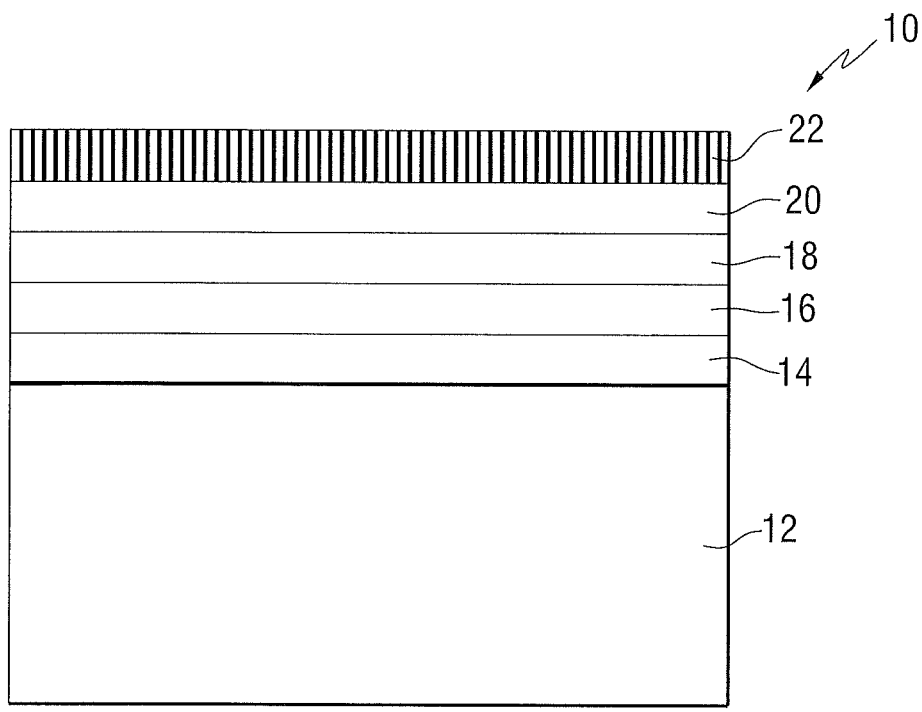
FIG. 1 is a cross-sectional view of an embodiment of recording media for use in heat assisted magnetic recording.
Figure 2:
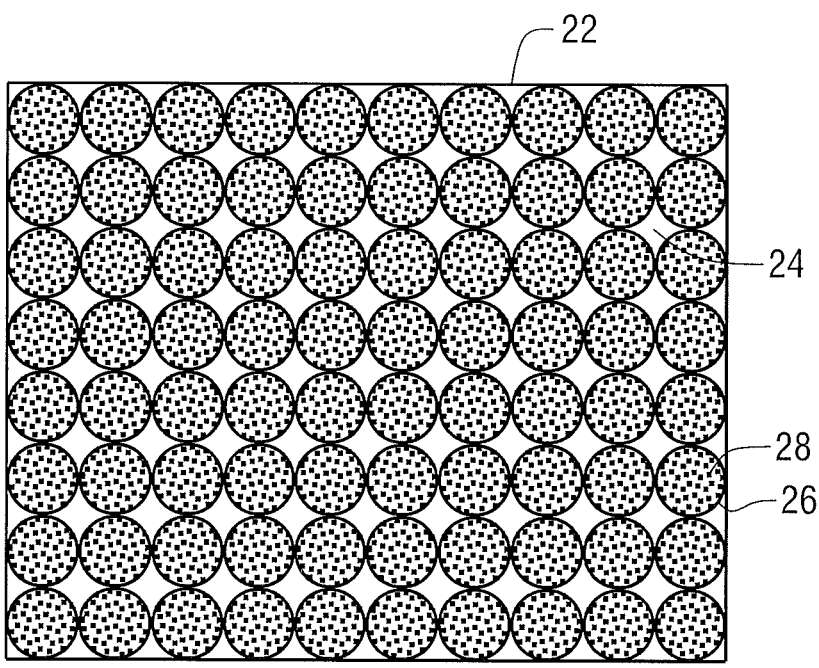
FIG. 2 is a plan view of the recording media of FIG. 1.

FIG. 1 is a cross-sectional view of a recording media 10 for use in heat assisted magnetic recording. FIG. 2 is a plan view of the recording media of FIG. 1. The recording media includes a stack of thin films including, in this example, a substrate 12, an interlayer 14, a heat sink 16, a seedlayer 18, a magnetic soft underlayer 20, and a storage layer 22.

FIG. 2 shows the storage layer 22, having intergranular segregates 24 and magnetic grains 26. The magnetic grains can have inclusions 28. In the example of FIGS. 1 and 2, the substrate can be, for example, glass or aluminum. The interlayer can be, for example, MgO or Al. The heatsink can be, for example, CuZr, Cu, or Au. The seedlayer can be, for example, MgO. The soft magnetic underlayer can be, for example, FeCoB, FeCoZr, or FeCoTa. The magnetic grains can be, for example, FePt, CoCrPt, or SmCo. The intergranular segregates can be, for example, C, $SiO_2$ or BN. The inclusions in the magnetic grains can be, for example, C, $SiO_2$ or BN. More generally, any material that exhibits one of the three main effects discussed herein could be used as a thermally active material. The thermally active material can be located in any of the locations described above. It can be, for example, a separate layer, in grain segregates, or in the grain boundaries. In other embodiments, one or more of the layers, segregates or inclusions may include thermally active materials in the form of phase change materials or semiconductors. The closer the thermally active material is to the storage layer, the larger the effect is going to be.

While FIGS. 1 and 2 show a particular example, it will be recognized by those skilled in the art that the recording media can have various combinations of layers including, but not limited to, storage or recording layers, seedlayers, interlayers, plasmonic underlayers, magnetic soft underlayers, thermal resistors, and heatsinks. Any of these layers could include thermally active materials having the thermal properties described herein, or other layers specifically intended to have the described thermal properties could exist in the stack. The thermally active materials could be in the form of sheet films, segregates at magnetic grain boundaries, or inclusions in the magnetic grains themselves.

Three thermal effects that can be utilized to control the thermal properties of the recording media include the thermal conductivity, specific heat, and latent heat of fusion (also called enthalpy of fusion).

Thermal conductivity effects are described by: $q = kAdT/s$, where q is the heat transferred per unit time (W), A is the heat transfer area ($m^2$), k is the thermal conductivity of the material (W/m), dT is the temperature difference across the material (° K or ° C.), and s is the material thickness (m).

Specific heat effects are described by: $Q=mC\Delta T$, where Q is the energy transferred to or from the mass (kJ), m is the mass of the body of interest (kg), $\Delta T$ is the change in temperature of the body (° K or ° C.), and C is the specific heat (kJ/(kg·K).

Latent heat of fusion effects are described by: Q=mL, where Q is the energy released or absorbed during the change of state of the substance (kJ), m is the mass of the substance (kg), and L is the specific latent heat for a particular substance (kJ-kg$_m^{-1}$) (substituted as $L_f$ for specific latent heat of fusion, $L_v$ as specific latent heat of vaporization).

Generally in a HAMR system, if the electric field profile in the recording media that is created by the NFT is compared to the resulting thermal profile, the thermal profile is a smoothed out version of the electric field profile. It is believed that the direction of magnetization of magnetic grains in the magnetic recording layer is changed (i.e., the magnetic transition is written) at approximately the location of the full-width-half-maximum (FWHM) of a Gaussian thermal profile in the recording layer. That is, the peak temperature is twice as high as the temperature where the transition is written. It would be advantageous if the thermal profile had a flat top shape to reduce the peak temperature. This can be accomplished if the thermal properties of the media are a function of temperature. Then the thermal properties of the media can amplify (i.e., increase) the electric field gradient instead of smoothing it out.

The thermal profile is important in HAMR, since the media magnetic anisotropy is a function of temperature. Also, it is desirable for the temperature (and thus the magnetic anisotropy) to have a large gradient (i.e., change per unit distance, dT/dx). If the media thermal properties are a function of temperature, some of the smoothing out of the resulting thermal profile could be offset. The smoothing out of the thermal profile in the media results from the heat conducting laterally (in the plane of the media) and not just vertically down into the heat sink.

Figure 3:
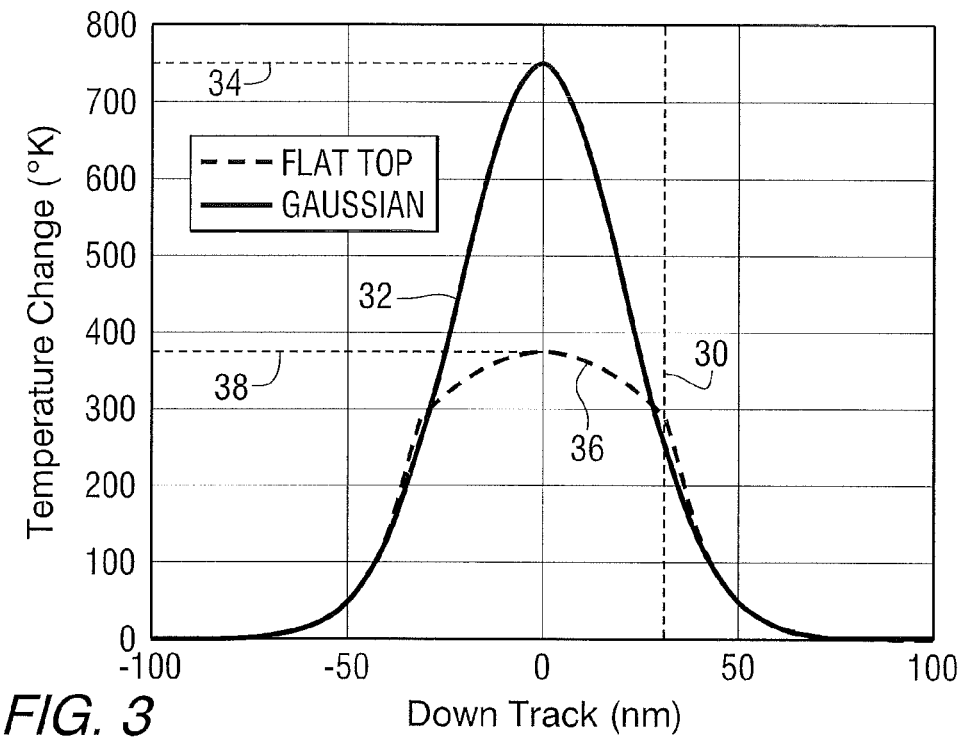
FIG. 3 is a graph of temperature change versus down-track position in an embodiment of HAMR recording media.

FIG. 3 illustrates a thermal profile as a graph of temperature change versus down-track position in a HAMR recording media. If the recording head magnetic field is set such that it can write to the media as the media cools to a $\Delta T$ of about 300° K, the dotted line 30 marks the location on the thermal profile in the media where the transition will be written. The temperature change represents the change in media temperature above the temperature of the media when it is not heated. In various examples, the Curie Temperature of the magnetic media can range from between about 200° C. to about 450° C., and the magnetic transition may occur between 0° C. and about 100° C. below the Curie Temperature.

In one example, if the thermal profile is a Gaussian profile illustrated by curve 32, the peak temperature in the media will be about 750° K, as shown by line 34 in this example. This may require that the media overcoat (MOC) and lubricant layer endure relatively high temperatures. Alternatively, if the thermal profile has a more flattened top as illustrated by curve 36, the same write temperature and location can be achieved with a much lower peak temperature indicated by line 38.

Figure 4:
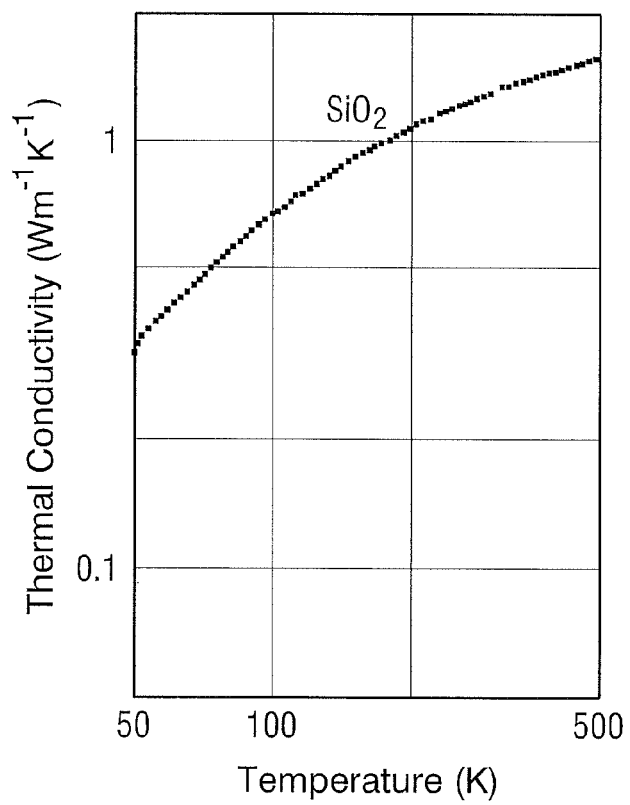
FIG. 4 is a graph of thermal conductivity versus temperature for $SiO_2$.
Figure 5:
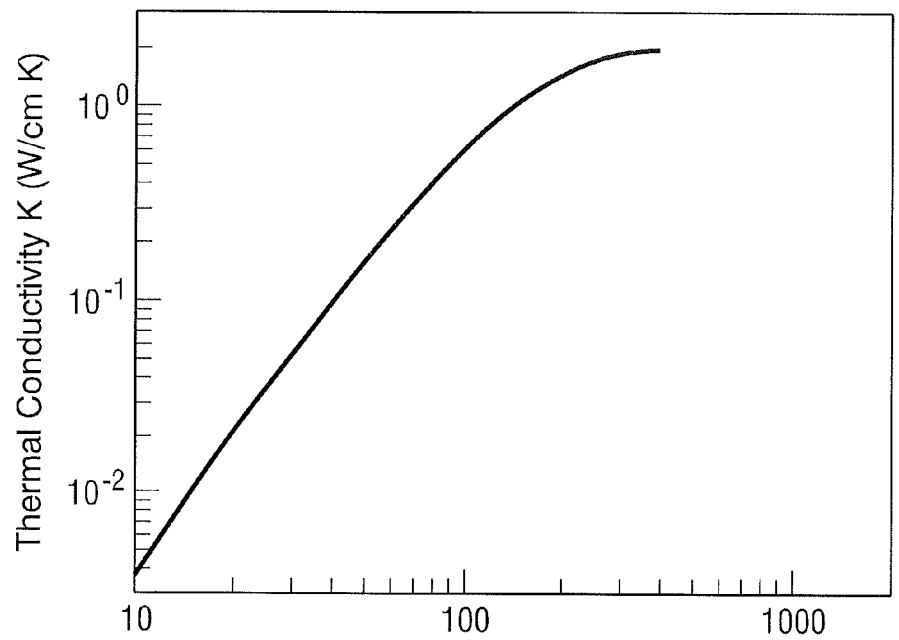
FIG. 5 is a graph of thermal conductivity versus temperature for BN.

In one embodiment, a flattened top thermal profile can be achieved by including a thermally active material in the media wherein the thermally active material has a thermal conductivity that increases with temperature in the range of temperatures over which the HAMR media will operate. This will result in a clamping of the peak temperature. As the media gets hotter, the energy can be more quickly transported to a heatsink (if the media includes a heatsink), and/or transported laterally if the lateral thermal conductivity of the material also increases with temperature. Two examples of the thermally active material in which conductivity that increases with temperature are silicon dioxide ($SiO_2$) and boron nitride (BN). FIGS. 4 and 5 show the thermal conductivities of $SiO_2$ and BN where the thermal conductivity increases with temperature.

Figure 6:
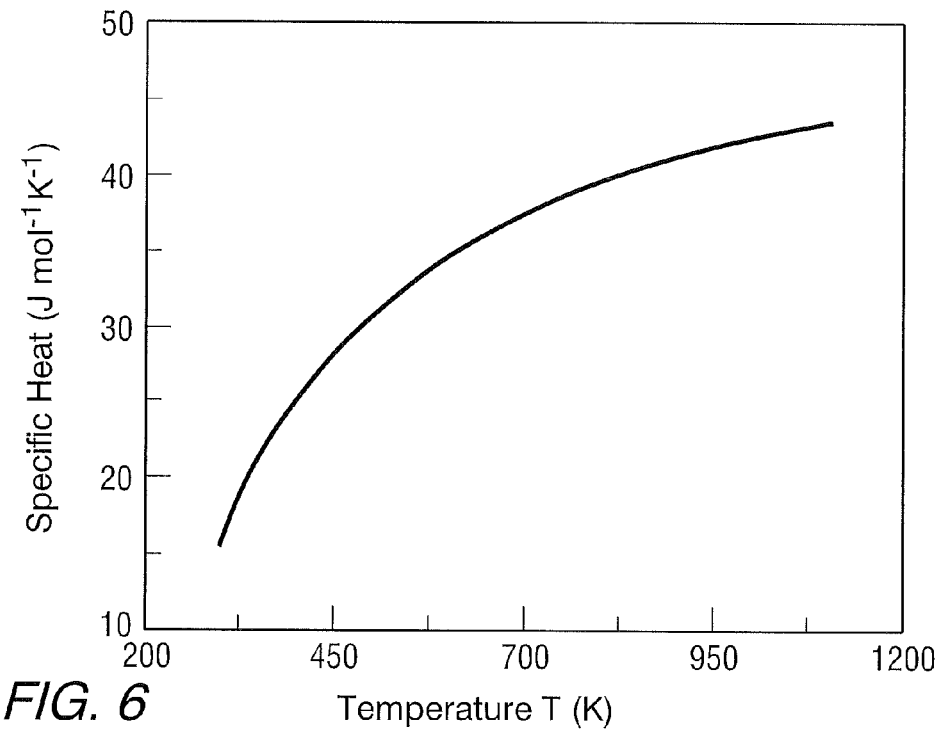
FIG. 6 is a graph of specific heat versus temperature for BN.

In another embodiment, the specific heat of a thermally active material can be a strong function of temperature and can increase with temperature. In this embodiment, the hotter the media gets, the more energy it takes to further increase the temperature, resulting in a flattened top thermal profile. BN has this property in the temperature range of interest in HAMR. FIG. 6 shows the specific heat for BN.

In another embodiment, the thermally active material can go through a phase transformation (such as melting) at a temperature where the flat top of the thermal profile is desired. When the media is exposed to a spot of light, such materials that have a melting point (MP) and a reasonably high latent heat of fusion (also called enthalpy of fusion) in the temperature range of interest will cause the media to continue to absorb energy without its temperature changing.

Table 1 shows several materials that have a melting point low enough such that the materials or alloys of the materials may be included in a data storage media.

TABLE 1

| Name | Formula | Atomic Wt. | mp/° C. | bp/° C. | Enthalpy of Fusion at MP $\delta_{fus}H/J\,g^{-1}$ | Density at 25° C. $\delta^{25}/g\,cm^{-3}$ | Linear Thermal Expansion $\delta/10^{-6}\,K^{-1}$ | Specific Heat $c_p/J\,g^{-1}\,K^{-1}$ | Thermal Conductivity $\delta(25°\,C.)/W\,m^{-1}\,K^{-1}$ |
|---|---|---|---|---|---|---|---|---|---|
| Antimony | Sb | 121.76 | 630.628 | 1587 | 162.5 | 6.68 | 11 | 0.207 | 24.3 |
| Zinc | Zn | 65.409 | 419.53 | 907 | 108.1 | 7.14 | 30.2 | 0.388 | 116 |
| Lead | Pb | 207.2 | 327.462 | 1749 | 23.1 | 11.3 | 28.9 | 0.127 | 35.3 |
| Cadmium | Cd | 112.411 | 321.069 | 767 | 55.2 | 8.69 | 30.8 | 0.231 | 96.8 |
| Thallium | Tl | 204.383 | 304 | 1473 | 20.3 | 11.8 | 29.9 | 0.129 | 46.1 |
| Bismuth | Bi | 208.98 | 271.406 | 1564 | 53.3 | 9.79 | 13.4 | 0.122 | 7.87 |
| Polonium | Po | 209 | 254 | 962 | | 9.2 | 23.5 | | 20 |
| Tin (white) | Sn | 118.71 | 231.93 | 2602 | 60.4 | 7.265 | 22 | 0.227 | 66.6 |
| Lithium | Li | 6.941 | 180.5 | 1342 | 432 | 0.534 | 46 | 3.57 | 84.7 |
| Indium | In | 114.818 | 156.6 | 2072 | 28.6 | 7.31 | 32.1 | 0.233 | 81.6 |
| Sodium | Na | 22.99 | 97.794 | 882.94 | 113.1 | 0.97 | 71 | 1.225 | 141 |
| Potassium | K | 39.098 | 63.5 | 759 | 59.6 | 0.89 | 83.3 | 0.757 | 102.4 |
| Rubidium | Rb | 85.468 | 39.3 | 688 | 25.6 | 1.53 | | 0.364 | 58.2 |
| Gallium | Ga | 69.723 | 29.7666 | 2204 | 80 | 5.91 | 18 | 0.374 | 40.6 |
| Cesium | Cs | 132.905 | 28.5 | 671 | 15.7 | 1.93 | 97 | 0.242 | 35.9 |

Figure 7:
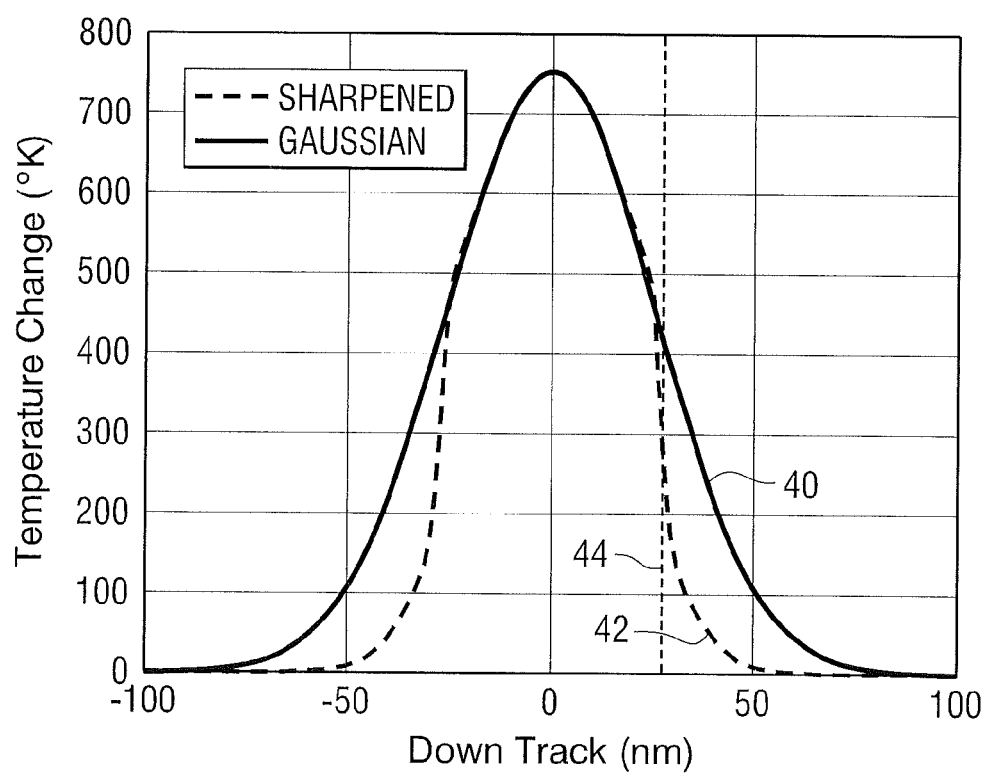
FIG. 7 is another graph of temperature change versus down-track position in an embodiment of HAMR recording media.

In another aspect of this disclosure, the properties of a thermally active material can be used to narrow the thermal profile of the media. In this case, the thermally active material properties can be used to increase the temperature of the center of the thermal profile relative to the outer edges, which would then result in a sharper thermal profile, and therefore a higher thermal gradient along the sides of the thermal profile. This is illustrated in the example of FIG. 7. Curve 40 is the Gaussian profile with a peak temperature in the media of about 750° K. Curve 42 is a sharpened thermal profile. Line 44 is the location of a point on the thermal profile where a magnetic transition will be written.

If the recording head magnetic field were such that it would write on the media when it cooled to a ΔT of about 300° K, the thermal gradient in this embodiment would be sharper than the standard Gaussian profile. This sharper thermal gradient (DT/DX) leads to a larger effective field gradient, $$\frac{DH_{\text{eff}}}{DX} = \frac{DH_k}{DT} \times \frac{DT}{DX} + \frac{DH_{\text{head}}}{DX},$$

where $DH_{\text{eff}}$ is the change in the effective field, $DH_k$ is the change in the media anisotropy, DT is change in temperature, $DH_{\text{head}}$ is change in head field, and DX is the change in distance either down-track or cross-track.

Some materials, such as iron, have a heat capacity that increases with increasing temperature, which is one of the three material properties that would help flatten the thermal profile. Table 2 shows the heat capacity versus temperature for iron. When used in a storage media, as the material gets hotter in the center of a region heated by a light spot, its ability to absorb the heat without increasing in temperature would also increase and thus, the media would not heat up as much.

TABLE 2

Heat Capacity Of Iron Conditions

| Temperature (K.) | Pressure (Pa) | Heat Capacity (J/Kg-K) |
|---|---|---|
| 200 | 101325 | 386.6 |
| 250 | 101325 | 425.1 |
| 298.15 | 100000 | 449 |
| 350 | 101325 | 470.6 |
| 400 | 101325 | 490.5 |
| 500 | 101325 | 531.8 |
| 600 | 101325 | 573.9 |

In another aspect, the disclosure encompasses an apparatus that includes: means for providing a recording media having a magnetic recording layer and a thermally active material embedded in and/or adjacent to the magnetic recording layer, wherein the thermally active material that has a thermal property that changes as the temperature of the thermally active material changes or the thermally active material undergoes a phase change in a predetermined temperature range; means for heating a portion of the magnetic recording layer and the thermally active material to a temperature above which the direction of magnetization of domains in the magnetic recording layer are to be switched, wherein the thermally active material reduces a peak temperature or increases a thermal gradient of the heated portion of the magnetic recording layer; and means for applying a magnetic field to the magnetic recording layer to switch the direction of magnetization of the domains.

The thermal property can be one or more of the thermal conductivity or specific heat. The thermally active material can include at least one of: a film, segregates adjacent to boundaries of the magnetic grains, or inclusions in the magnetic grains in the magnetic recording layer. In various embodiments, the thermally active material can have a phase transformation in the range of about 200° C. to about 500° C., the thermally active material can have a thermal conductivity that increases or decreases with temperature, or the thermally active material can have a specific heat that increases with temperature.

The means for heating a portion of the magnetic recording layer and the thermally active material can apply a pulsed light to the magnetic recording layer.

Figure 8:
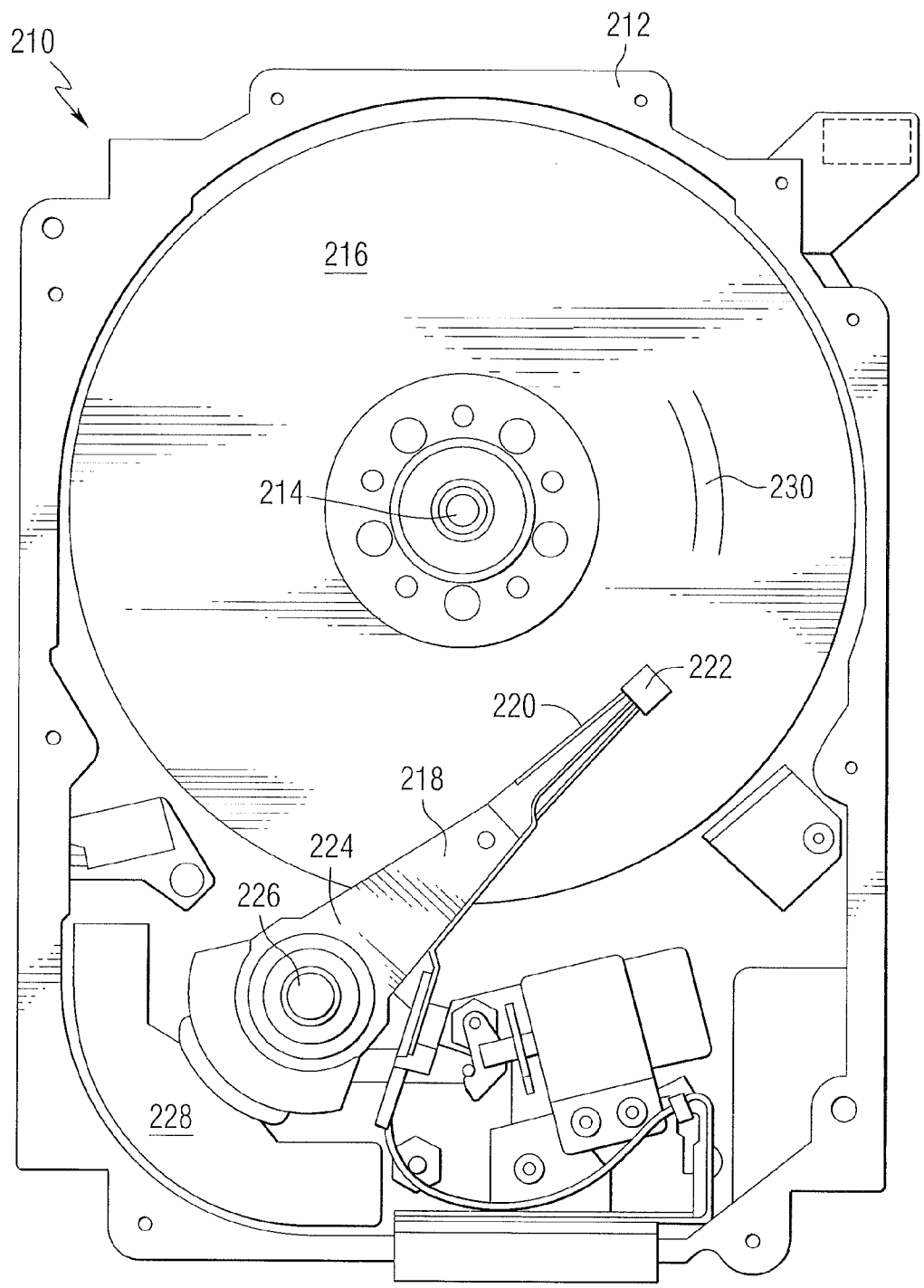
FIG. 8 is a pictorial representation of a data storage device that can include an embodiment of the disclosed recording media.

FIG. 8 is a pictorial representation of a data storage device in the form of a disc drive that can include a recording media constructed in accordance with the disclosure. The disc drive 210 includes a housing 212 (with the upper portion removed and the lower portion visible in this view) sized and configured to contain the various components of the disc drive. The disc drive 210 includes a spindle motor 214 for rotating at least one storage medium 216, which may be a magnetic recording medium, within the housing 212. At least one positioned member such as an arm 218 is contained within the housing 212, with each arm 218 having a first end 220 with a recording head or slider 222, and a second end 224 pivotally mounted on a shaft by a bearing 226. An actuator motor 228 is located at the arm's second end 224 for pivoting the arm 218 to position the recording head 222 over a predetermined sector or track 230 of the disc 216. The actuator motor 228 is regulated by a controller, which is not shown in this view and is well-known in the art. Means can be included to subject the recording media to a spot of light in a region where data is to be recorded. For example, the slider can include a laser, waveguide, and near-field transducer, where the near-field transducer has an end positioned adjacent to an air bearing surface of the slider, and light from the laser is directed onto the NFT by the waveguide. Part of the LSP field from the NFT will tunnel into the recording media and get absorbed, raising the temperature of the media locally for recording. The laser can supply continuous or pulsed light.

Some of the materials and concepts described above will be more compatible with pulsed recording than continuous laser recording. For example, if the thermally active material in the recording media goes through a full phase transition quickly (relative to the time it is heated by a light spot, which is approximately the (spot size)/(velocity)) and then starts heating again when a continuous wave light is used, a pulsed recording mode may be used. A pulsed laser light would dump less energy into the media, so it may never fully drive the media through the phase transition.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:
1. An apparatus comprising:
a magnetic recording layer; and
a thermally active material in contact with the magnetic recording layer, wherein the thermally active material has a thermal property that changes when the tempera- ture of the thermally active material changes to reduce a peak temperature of a heated portion of the magnetic recording layer.

2. The apparatus of claim 1, wherein the thermal property comprises:
thermal conductivity or specific heat.

3. The apparatus of claim 1, wherein the thermally active material comprises at least one of:
a film, segregates adjacent to boundaries of magnetic grains in the magnetic recording layer, or inclusions in the magnetic grains.

4. The apparatus of claim 1, wherein the thermally active material has a thermal conductivity that increases with temperature.

5. The apparatus of claim 1, wherein the thermally active material has a specific heat that increases with temperature.

6. An apparatus comprising:
a storage media including a magnetic recording layer and a thermally active material in contact with the magnetic recording layer, wherein the thermally active material has a thermal property that changes when the temperature of the thermally active material changes to reduce a peak temperature of a heated portion of the magnetic recording layer;
a recording head; and
a positioning device for positioning the recording head adjacent to the storage media.

7. The apparatus of claim 6, wherein the thermal property comprises:
thermal conductivity or specific heat.

8. The apparatus of claim 6, wherein the thermally active material comprises at least one of:
a film, segregates adjacent to boundaries of magnetic grains in the magnetic recording layer, or inclusions in the magnetic grains.

9. The apparatus of claim 6, wherein the thermally active material has a thermal conductivity that increases with temperature.

10. The apparatus of claim 6, wherein the thermally active material has a specific heat that increases with temperature.

11. An apparatus comprising:
means for providing a recording media having a magnetic recording layer and a thermally active material in contact with the magnetic recording layer, wherein the thermally active material has a thermal property that changes as the temperature of the thermally active material changes;
means for heating a portion of the magnetic recording layer and the thermally active material to a temperature above which the direction of magnetization of domains in the magnetic recording layer are to be switched, wherein the thermally active material reduces a peak temperature of the heated portion of the magnetic recording layer; and
means for applying a magnetic field to the magnetic recording layer to switch the direction of magnetization of the domains.

12. The apparatus of claim 11, wherein the thermal property comprises:
thermal conductivity or specific heat.

13. The apparatus of claim 11, wherein the thermally active material comprises at least one of:
a film, segregates adjacent to boundaries of the magnetic grams, or inclusions in the magnetic grains in the magnetic recording layer.

14. The apparatus of claim 11, wherein the means for heating a portion of the magnetic recording layer and the thermally active material to a temperature above which the direction of magnetization of the magnetic domains is to be switched applies a pulsed light to the magnetic recording layer.

15. The apparatus of claim 11, wherein the thermally active material has a thermal conductivity that increases with temperature.

* * * * *